United States Patent
Egami et al.

(12) 
(10) Patent No.: US 6,476,116 B1
(45) Date of Patent: Nov. 5, 2002

(54) RESIN COMPOSITIONS AND PRECISION SLIDING PARTS MADE OF THE SAME

(75) Inventors: Masaki Egami, Mie (JP); Takuya Ishii, Mie (JP); Eiichiro Shimazu, Mie (JP)

(73) Assignee: NTN Corporation, Osaka (JP)

( * ) Notice: Subject to any disclaimer, the term of this patent is extended or adjusted under 35 U.S.C. 154(b) by 6 days.

(21) Appl. No.: 09/667,545

(22) Filed: Sep. 22, 2000

(30) Foreign Application Priority Data

Sep. 22, 1999 (JP) ............................................ 11-268894
Nov. 10, 1999 (JP) ............................................ 11-319951
Aug. 21, 2000 (JP) ....................................... 2000-249656

(51) Int. Cl.$^7$ ................................................. C08K 3/04
(52) U.S. Cl. ...................................................... 524/495
(58) Field of Search ......................................... 524/495

(56) References Cited

U.S. PATENT DOCUMENTS

| | | | | |
|---|---|---|---|---|
| 4,324,706 A | * | 4/1982 | Tabe | .......................... 523/149 |
| 4,532,281 A | * | 7/1985 | Lee | ............................ 524/141 |
| 4,787,991 A | * | 11/1988 | Morozumi | .................. 252/12.4 |
| 4,970,256 A | * | 11/1990 | Inoue | .......................... 524/404 |
| 5,200,454 A | * | 4/1993 | Nakano | ....................... 524/409 |
| 5,282,673 A | * | 2/1994 | Koyama | ....................... 301/64.4 |
| 5,294,654 A | * | 3/1994 | Burnell | ........................ 524/127 |
| 5,637,399 A | * | 6/1997 | Yoshikawa | ................... 428/369 |
| 5,998,008 A | * | 12/1999 | Shimamura | .................. 428/323 |

* cited by examiner

*Primary Examiner*—Paul R. Michl
(74) *Attorney, Agent, or Firm*—Wenderoth, Lind & Ponack, L.L.P.

(57) ABSTRACT

Resin composition and precision sliding parts are proposed. The resin composition includes a modified polyphenylene ether resin as a main component, a fibrous reinforcing agent, and a solid lubricant comprising tetrafluoroethylene and graphite in the amount of 2–30 volume %. The modified polyphenylene ether resin is prepared by blending a polystyrene-family resin with a polyphenylele ether resin. The ratio of the tetrafluoroethylene resin and the graphite is 1:1 to 1:5. The fibrous reinforcing agent is glass fiber or carbon fiber. The fibrous reinforcing material is orientated such that the angle of fiber axis is not more than 30 degrees with respect to the sliding surface. The fibrous reinforcing material is a fibrous reinforcing material having a fiber diameter of 10 $\mu$m or less.

6 Claims, 2 Drawing Sheets

RESIN COMPOSITIONS AND PRECISION SLIDING PARTS MADE OF THE SAME

BACKGROUND OF THE INVENTION

This invention relates to resin compositions and precision sliding parts made of such resin compositions used for sliding portions of carriages mounted on printers, optical or magneto-optic electronic image memory/reading devices or memory devices used with MO, DVD or CD-ROM, and precision sliding parts of other electronic devices.

For printers and optical or magneto-optic image memory/reading devices (or scanners), which are input/output devices for computers, and memory devices used with MO, DVD and CD-ROM, it is necessary to smoothly move and accurately position scanning parts or printing heads, or optic or magneto-optic pickups. Devices for smoothly moving them along an orbit are called carriages.

For sliding parts such as carriages or precision sliding parts of electronic devices, extremely high dimensional accuracy and stable sliding properties at normal temperature are required. It is also required that they can perform precise positioning and smooth movement.

For precision sliding parts made of synthetic resin, it is required that they have precision molding properties including low molding shrinkage rate and small molding strain, and that sliding parts and mating parts are both usable in low wear amounts. As conventional resin materials for such sliding parts, those are known in which modified polyphenylene ether, polybutyleneterepht halate or polycarbonate is used as a main component and glass fiber and tetrafluoroethylene (PTFE) resin are added to increase precision molding properties.

In a resin material for forming precision sliding parts of electronic devices, PTFE is added to improve lubricity. But it is difficult to sufficiently stabilize with only PTFE the sliding properties including low friction coefficient. Normally, grease and lubricating oil (hereinafter referred to as grease and the like) are further applied to the sliding surface to give it required sliding properties.

For precision sliding parts made of synthetic resin for electronic devices, their mating member is made of stainless steel or steel whose surface is treated by electric nickel plating. They are metallic materials which are relatively low in hardness.

A conventional resin composition for precision sliding parts, which is used with grease and the like, due to scattering and evaporation of lubricant, may pollute the environment and the inside of the device.

Also with the conventional resin composition for precision parts, which is used grease and the like, dust tends to stick to the sliding portion. If dust invades the sliding surface, the mating member and the bearing portions may be worn by dust.

Also, in a conventional resin composition for precision sliding parts, which is used with grease and the like, if maintenance is neglected, lubricant may become scarce. This may cause abnormal sound due to shortage of lubricant.

With precision molded bodies comprising a conventional lubricative resin, it is difficult to sufficiently stabilize their sliding properties. The fibrous reinforcing material added so that they can be molded to accurate dimensions can damage the mating members.

If the mating member is made of a metallic material of relatively low hardness, it may be damaged by high-hardness fibrous reinforcing material such as glass fiber, and if the mating member is damaged even slightly and the sliding surface becomes rough, wear speed is accelerated quickly.

In particular, for precision sliding parts of electronic devices made of synthetic resin, when they begin to slide not smoothly, they may have bad influence on the function of the electronic machines or devices. For example, if the sliding properties of a carriage of a computer printer or scanner lower, disturbance may occur in read or reproduced images or noise may be produced due to increase in mechanical sound.

An object of this invention is to provide precision sliding parts made of a resin composition which have required precision molding properties and dimensional stability, which are low in friction coefficient, stable in sliding properties and superior in wear resistance, and which allow use without grease.

SUMMARY OF THE INVENTION

According to this invention, there is provided a resin composition for precision sliding parts, the resin composition comprising a modified polyphenylene ether resin as a main component, a fibrous reinforcing agent, and a solid lubricant comprising tetrafluoroethyelene resin and graphite in the amount of 2–30 volume %.

Such a resin composition according to the present invention has good heat resistance, fire retardancy and injection moldability. Because of low specific weight, the end product is light weight. Also, the fibrous reinforcing agent added gives good dimensional stability.

The modified polyphenylene ether resin used in the present invention is an alloy of polyphenylene ether with one or more selected from a noncrystalline polystyrene resin, a crystalline polystyrene resin such as syndiotactic polystylene resin and a polyamide resin. Such a resin is free from shrinkage or deformation upon crystallization and excellent in dimensional stability.

Because both tetrafluoroethylene resin and graphite are used as solid lubricants, the resin composition according to the present invention can form a transfer film of low friction coefficient on the mating member and exhibit good slidability and wear resistance not obtained with tetrafluoroethylene resin only.

The resin composition according to the present invention has both stably low friction coefficient and excellent wear resistance because it contains tetrafluoroethylene resin and graphite in the amount of 2 to 30 volume %. These properties do not impair the fire retardancy and moldability of modified polyphenylene ether (PPE).

The fibers dispersed in the sliding part increase the contact area of the fiber ends with the mating member. This reduces damage to the mating member by fibers and minimizes the amount of wear of the sliding surface.

Though dispersed in the resin, the fibrous reinforcing material used in this invention reinforces the lubricative resin composition. The precision sliding part thus reinforced meets the required precision moldability and exhibits low friction coefficient.

DETAILED DESCRIPTION OF THE PREFERRED EMBODIMENT

Figure 1:
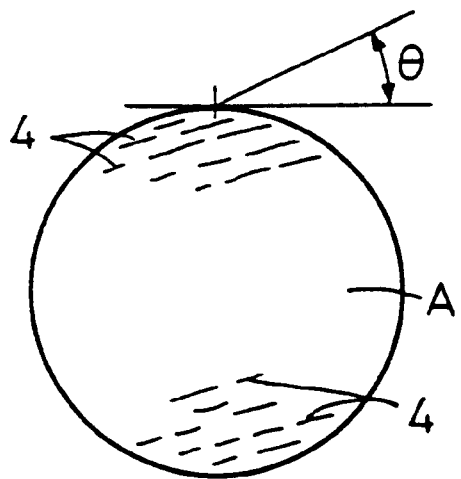
FIG. 1 is an end view of a columnar precision sliding part embodying the present invention.

As the modified polyphenylene ether resin used in this invention, it is preferable to use a polymer alloy in which a polyphenylene ether (hereinbelow abbreviated to PPE) such as poly (2,6-dimethylphenylene ether) is blended with a polystyrene-family resin such as amorphous polystyrene resin or crystalline polystyrene resin such as syndiotactic polystyrene because heat resistance, dimensional stability and low specific weight are satisfied. These materials mix together sufficiently simply by mixing, melt-kneading and extruding, and the blend obtained will have properties withstanding use. As commercial modified PPE resins in which is blended a polystyrene resin, Xyron made by Asahi Chemical Industry and Noryl made by GE Plastics Japan can be cited. This may be of a grade in which a flame-retardant is added.

Also, as the modified PPE resin, it is preferable to employ one which is heat-resistant, flame-retardant and precision-moldable. It may also be a modified PPE resin in which a resin other than a polystyrene resin is blended. For example, as resins blendable with a PPE resin, polyamide resins, polyethyelene resins, polyphenylene sulfide resins and thermoplastic polyester resins such as polybutyleneterephthalate resins can be cited.

The lubricative resin composition used in the present invention may be a self-lubricating resin, a resin composition containing a self-lubricating resin, or a resin composition in which a non-resin solid or liquid lubricant is added.

As a resin for the substrate (or main component) of the resin composition, a synthetic resin suitable for precision molding may be employed, such as phenolic resin, urea resin, melanin resin, polyamide resin, polyacetal resin, polycarbonate resin, methacryl resin, polystyrene, ABS resin, polyetherimide resin, polyamideimide resin, polyimide resin, ionomer resin, polyphenylene ether resin, metylpentene polymer, polyallylsulfon, polyallylether, polyetherketone, polyphenylene sulfide, polysulfon, aromatic polyester, polyethyleneterephthalate, polybutyleneterephthalate and fluororesin may be cited.

If the precision sliding part has a complicated shape, an injection-moldable thermoplastic resin is preferable. Among thermoplastic resins, modified polyphenylene ether in which polyphenylene ether is the main component, and polystyrene, especially syndiotactic polystyrene which is a crystalline polymer made by giving regularity to the molecular structure, are preferable.

While the fibrous reinforcing agent used in this invention is added to stabilize the linear expansion coefficient of a modified PPE resin to a low level and to lower the molding shrinkage rate, it should be added so as not to impair the precision moldability of the modified PPE.

As the fibrous reinforcing agent, glass fiber, pitch-family carbon fiber, PAN-family carbon fiber, alumina fiber, boron fiber, silicon carbide fiber, silicon nitride fiber, boron nitride fiber or metallic fiber may be used. Among them, glass fiber is especially preferable because it is high in the reinforcing effect and is inexpensive. Carbon fiber is preferable because it has good wear resistance even if the mating member is a soft member such as aluminum. As the fibrous reinforcing material, in order to improve uniform dispersibility for the modified PPE resin, one subjected to surface treatment such as silane coupling is preferable.

The fiber diameter of the fibrous reinforcing material, in order not to damage the mating member and not to produce frictional sounds, should preferably be 10 $\mu$m or less. The fiber length of the fibrous reinforcing material should have such a value that satisfies the conditions in which the composition can be molded accurately. Though such fiber length varies with the kind (hardness and resilience) of fiber, for example, glass fiber having a fiber length of 3 mm may be used. For reference, such fiber is considered to break and become shorter than at the time of mixing during preparation of a compound and during injection molding.

The mixing amount of the fibrous reinforcing material such as glass fiber and carbon fiber should preferably be 3 to 25 volume %, and more preferably 5 to 20 volume %. If less than the predetermined rate, the reinforcing effect would not be sufficient, and if added in larger amounts exceeding the predetermined amount, the flowability of the modified PPE resin in a molten state will be lower so that it becomes difficult to mold with precision. Also, even if precision molding is possible, it may attack and damage the mating member.

If the orientation angle of the fiber axis of the fibrous reinforcing material is adjusted, it is not necessary to limit the fiber diameter and fiber length of the fibrous reinforcing material. But if a fibrous reinforcing material having a fiber diameter of 20 $\mu$m or under is used, the function of not damaging the mating member and not producing frictional sound is more reliably expected. Also, the fiber length has only to be adjusted so as to have precise moldability. Though it varies with the kind (hardness, resilience) of fiber, glass fiber having a fiber length of 3 mm may be used. For reference, such fiber is considered to break and become shorter than at the time of mixing during preparation of a compound and during injection molding.

In order to adjust the orientation angle of the fiber axis of the fibrous reinforcing material, a resin molded body in which fibers are orientated is formed and then worked by cutting as necessary. If injection molding is carried out, it is possible to orientate the fibrous reinforcing material so as to be parallel to the flow direction of the molten resin. Besides, at a weld portion, which is a portion where flow of the molten resin merges in the mold, the fibrous reinforcing material is orientated perpendicularly to the flow direction of the resin.

In order to orientate it so that the angle of the fiber axis relative to the sliding surface is 30° or less by utilizing such orientation properties during molding, a mold is designed such that the flow direction of the resin during injection molding is substantially parallel to the sliding surface, and the weld portion should be adjusted not to appear on the sliding surface.

The sliding direction relative to the axial direction of the fibrous reinforcing material is not limited. If the angle between the fiber axis and the sliding surface is 30° or less, intended effects are obtained. If it exceeds 30°, the sliding surface of the sliding part tends to damage the mating member, so that the friction coefficient increases sharply during sliding and sliding sounds are thus produced.

Figure 2:
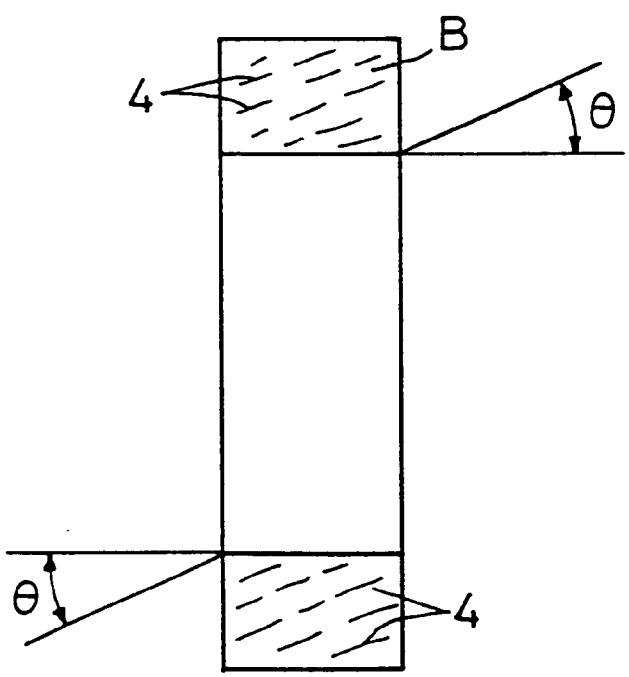
FIG. 2 is a sectional view of a tubular precision sliding part.

As shown in FIGS. 1 and 2, in the case of precision sliding parts A, B whose sliding surfaces are curved circular surfaces (columnar in FIG. 1 and cylindrical in FIG. 2), the angle $\theta$ between the plane containing a tangent at each portion of the sliding surface and the fiber axis of the fibrous reinforcing material 4 with each portion of the sliding surface should be 30° or under.

The portion where the angle of the fiber axis is controlled may be limited to the superficial layer of the sliding surface while inside of the molded body, the fiber axes may be orientated in random directions. In such a case, the thickness of the superficial layer in which the fiber axis angle is controlled should be about 1000 $\mu$m.

On the other hand, if the sliding surface is formed by a lubricative resin composition in which a fibrous reinforcing material having a fiber diameter of 10 $\mu$m or under is added in a dispersed state, the angle between each portion of the sliding surface and the fiber axis of the fibrous reinforcing material is not specifically limited. For example, the fibrous reinforcing material may be dispersed in an unorientated state.

If a fibrous reinforcing material having a fiber diameter exceeding 10 $\mu$m is used, it tends to damage the mating member. Accompanying the damage, the friction coefficient increases sharply, thus generating sliding sounds. This tendency is prominent if it is orientated so that the fiber axis and the sliding surface intersect at a large angle of 30° or over. In view of this tendency, the fiber diameter of the fibrous reinforcing material should be 8 $\mu$m or under, and practically should be 3–10 $\mu$m and preferably 4–8 $\mu$m.

For the solid lubricant used in this invention, tetrafluoroethylene resin (PTFE) and graphite (GRP) are used together. PTFE and graphite may be powdery and the volume ratio of PTFE to graphite should be 1:1 to 1:5.

If PTFE or graphite is added in a larger amount exceeding this ratio, required wear resistance would not be obtained for the resin composition. In particular, if the precision sliding part is a carriage of an electronic image scanner or a printing head, such a tendency is observed markedly. In view of such a tendency, the volume ratio of PTFE to graphite should be 2:3 to 2:5. The amount of the solid lubricant should be 2 to 30 volume %. If less than the above range, sufficient sliding properties (low friction coefficient) will not be obtained. Also, if added in a greater amount exceeding the above range, the mechanical properties (strength) of the resin composition would be insufficient. Also, melt-flowability of the resin composition would lower and injection molding would become difficult.

The lubricant to be mixed in the lubricative resin composition may be a solid lubricant, a liquid lubricant or a combination thereof. As a solid lubricant, tetrafluoroethylene resin, graphite, molybdenum disulfide may be used. As a liquid lubricant, a synthetic lubricating oil such as mineral oil, polyol ester oil, diester oil, ether oil, polyphenylene ether oil, polyalphaolefin oil, silicone oil, fluorinated oil, cyclopentane oil, or a purified natural lubricating oil may be used. Especially preferable solid lubricants are tetrafluoroethylene resin, graphite and a combination thereof.

To the resin composition for precision sliding parts, various additives or fillers for improving physical properties may be mixed so as not to impair the effect of this invention. As such additives or fillers, carbon, mica, talc, whiskers such as wollastonite, metallic oxide, potassium titanate, titanium oxide, zinc oxide, aluminum borate, calcium carbonate and calcium sulfate; molybdenum disulfide, phosphate, carbonate, stearate, tetrafluoroethylene-perfluoroalkylvinylether copolymer (PFA), tetrafluoroethylene-hexafluoropropylene copolymer (FEP), tetrafluoroethylene-hexafluoroethylene-perfluoroalkylvinylether copolymer (EPE) can be cited.

The resin composition according to the present invention can be applied to the entirety of a sliding part, or may be used so as to coat its sliding surface in a minimum thickness. Also, the precision sliding part formed of the resin composition of this invention can be used without using any liquid lubricant or grease. But if use of grease or lubricating oil would pose no problem, they may be used of course. Also, on the sliding surface of the mating member of the precision sliding part made of the resin composition according to this invention, coating, plating or the like may be provided so that a solid lubricant or a lubricating oil will be present beforehand. Or it may be one formed with a lubricative film such as a diamond-like carbon or a rust-preventive film such as a nickel or zinc plating.

EXAMPLES AND COMPARATIVE EXAMPLES

Raw materials used in Examples and Comparative Examples are comprehensively shown, and in brackets, abbreviations used in the tables are shown.
(1) modified polyphenylene ether resin [modified PPE] Xyron 600H made by Asahi Chemical Industry
(2) glass fiber [GF1] Chopped strand CSO3JA497 made by ASAHI Fiber Glass
(3) glass fiber [GF2] Chopped strand CSO3T-531DE made by Nippon Electric Glass
(4) carbon fiber [CF] KRECA C-103T made by Kureha Chemical Industry
(5) tetrafluoroethylene resin [PTFE] Hostaflon TF9205 made by Sumitomo 3M
(6) graphite [GRP] KS10 made by LONZA Examples 1–7, Comparative Examples 1–2

The raw materials shown in Table 1 were blended in the blend rate shown in the same table while supplying the fibrous reinforcing material at an intermediate portion of a twin-screw extruder, and melt-kneaded and extruded to manufacture pellets.

Figure 3A:
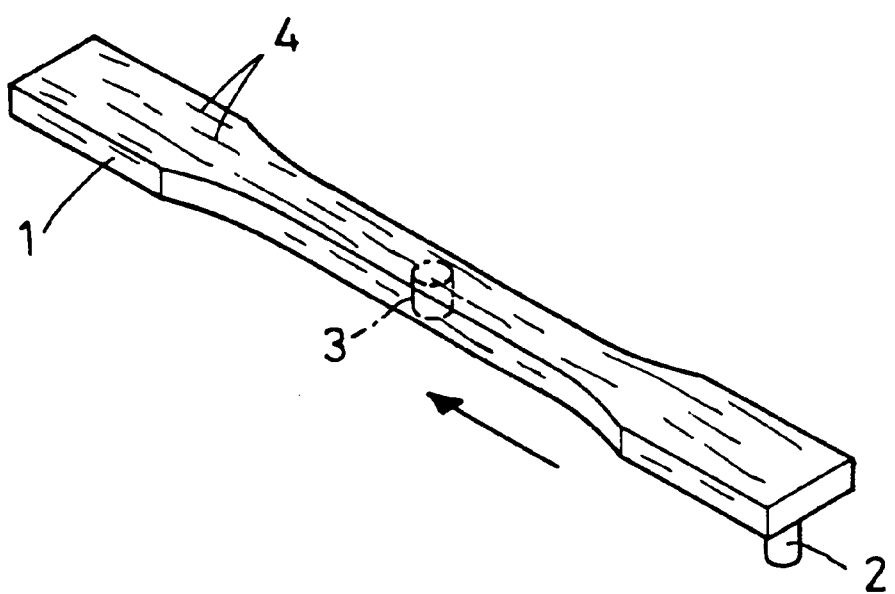
FIG. 3A is a perspective view of a dumbbell type specimen.

The pellets obtained were supplied to an injection molding machine and a 3 mm-thick dumbbell shaped specimen 1 (under JIS No 1) as shown in FIG. 3A was prepared at a resin temperature of 310° C. and a mold temperature of 110° C.

In the injection molding, an injection-molding gate 2 was arranged such that the flow direction (shown by arrows in FIG. 3A) of the molten resin coincides with the longitudinal direction of the dumbbell type specimen, and columnar pin type specimens (diameter: 3 mm, height: 2 mm) were cut out of a central constricted portion of the dumbbell type specimens. During cutting, the cutout position was adjusted so that the fibrous reinforcing material 4 will be orientated parallel on the circular end faces of the pin type specimen 3.

Using the pin type specimens obtained, friction/wear tests were conducted under the following conditions. The results are shown in Table 1.
<friction/Wear Test>

Using a pin on disk type friction/wear tester, measurements were made under the following test conditions.

Measurements were made for dynamic friction coefficient immediately after start of the test, dynamic friction coefficient at the end of the 20-hour continuous friction test, and the axial wear height of the pin type specimens (that is, length of the worn portion).

Surface pressure: 0.1 MPa
Speed: 36 m/min.
Atmospheric temperature: 30° C.
Material of the mating member: electro-nickel-plated (hereinafter referred to as Ni plating) steel plate (surface roughness Ra=0.04 μm) and zinc-plated (hereinafter referred to as Zn-plated) steel plate (surface roughness Ra=0.04 μm)

Sliding direction: slid so that the fibrous reinforcing material orientated on the specimen surface will slide parallel to the mating member. Test time: 20 hours As will be apparent from the results of Table 1, in Comparative Example 1, in which the glass fiber was added to the modified PPE resin with only PTFE added and graphite was not added, when an Ni-plated steel plate was the mating member, friction coefficient increased by as much as 43% from 0.46 to 0.66 during the 20-hour friction test, and the amount of wear was large. Also, in Comparative Example 1 when the mating member was a Zn-plated steel plate, increase in friction coefficient was scarcely observed, but the amount of wear was extremely large.

In Comparative Example 2 in which glass fiber was added to modified PPE resin with only graphite added and PTFE not added, although increase in friction coefficient during the 20-hour friction test remained as low as about 14% from 0.42 to 0.48, the wear amount was extremely large. Also, in Comparative Example 1, when the mating member was a Zn-plated steel plate, although the friction coefficient did not increase so markedly, the wear amount was extremely large.

On the other hand, in Examples 1–7, in which glass fiber was added to modified PPE resin and both PTFE and graphite (GRP) were added, when the mating member was a Ni-plated steel plate, the friction coefficient was low and stable even after the 20-hour test. Further, the wear amount was as low as 6–38 μm. Thus they showed excellent sliding properties and wear resistance. Also, in Examples 1–7, when the mating member was a Zn-plated steel plate, which was softer than Ni-plated one, the friction coefficient was low and the wear amount also was as low as 4–12 μm and showed very excellent sliding properties.

The raw material used in Examples 8–11 and Comparative Examples 3–6 are shown below, and in brackets, abbreviations used in the tables are shown.

(1) modified polyphenylene ether resin [modified PPE] Xyron 600H made by Asahi Chemical Industry
(2) syndiotactic polystyrene resin [SPS] XAREC S131 made by Idemitsu Petrochemical Co. (glass fiber 30 % mixed, fiber diameter: 10 μm)
(3) glass fiber (GF) Chopped strand CSO3MA497 made by ASAHI Fiber Glass
(4) tetrafluoroethylene resin [PTFE] Hostaflon TF9205 made by Sumitomo 3M
(5) graphite [GRP] KS10 by LONZA Examples 8–11, Comparative Examples 3–6

The raw materials shown in Table 2 were blended at the blend rate shown in the same table (for Examples 8, 9 and Comparative Examples 3, 5, by supplying fibrous reinforcing material at an intermediate portion of a twin-screw extruder), and melt-kneaded and extruded to prepare pellets. The pellets obtained were supplied to an injection molding machine and a 3 mm-thick dumbbell type specimen 1 (under JIS No 1) as shown in FIG. 3A was prepared under the molding conditions shown in Table 2.

Figure 3B:
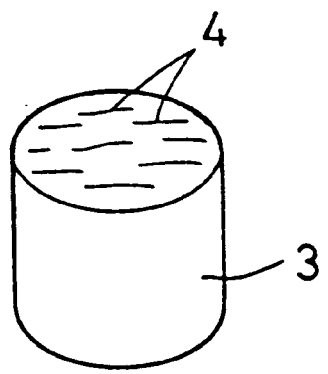
FIG. 3B is a perspective view of a pin type specimen.
Figure 3C:
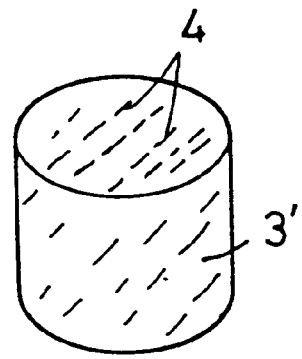
FIG. 3C is a perspective view of another pin type specimen.

In the injection molding, an injection-molding gate 2 was arranged such that the flow direction (shown by arrows in FIG. 3A) of the molten resin would coincide with the longitudinal direction of the dumbbell type specimen, and columnar pin type specimens 3 (diameter: 2.5 mm, height: 2 mm) were cut out of a central constricted portion of the dumbbell type specimen, where orientation of the fibrous reinforcing material 4 was the most stable. When cutting it, as shown in FIGS. 3B and 3C, the cut-out positions were adjusted so that the axis of the fibrous reinforcing material 4 would be orientated at an angle of 0 degree (parallel), 30 degrees, 45 degrees and 90 degrees (perpendicular) with respect to the circular end faces of the pin type specimens 3 or 3'.

Using the pin type specimens obtained, a friction/wear tests were conducted under the following conditions. The results are shown in Table 2.

As will be apparent from the results of Table 2, in Comparative Examples in which sliding was made with the angle of fiber axis of the fibrous reinforcing material being larger than 30° relative to the sliding surface, although the friction coefficient was low immediately after start of the test, as the testing time passed, it damaged the nickel-plated surface of the mating member, and thereafter the friction coefficient increased sharply, so that at the end of the test, it increased to more than twice the value at the start. Also, in Comparative Examples 4 and 6, in which the fiber axis angle was as large as 90°, sliding sounds were produced during the test.

In contrast, in Examples in which sliding was made with the fiber axis angle of the fibrous reinforcing material being 30° or below with respect to the sliding surface, change in the friction coefficient during the test was small and the surface roughness of the mating member was small and kept smooth. Also there was no sliding sound.

Next, the raw materials used in Examples 12–15 and Comparative Examples 7, 8 are shown, and in brackets, abbreviations used in the tables are shown.

(1) modified polyphenylene ether resin [PPE] Xyron 600H made by Asahi Chemical Industry
(2) syndiotactic polystyrene resin [SPS] XAREC S131 made by Idemitsu Petrochemical Co.
(3) tetrafluoroethylene resin [PTFE] Hostaflon TF 9205 made by Sumitomo 3M
(4) graphite [GRP] KS10 made by LONZA
(5) glass fiber [GF (13 μm)] Chopped strand CSO3MA497 made by ASAHI Fiber Glass, Fiber diameter: 13 μm
(6) glass fiber [GF (6 μm)] ECS03T-531DE made by Nippon Electric Glass Fiber diameter: 6 μm
(7) glass fiber [GF (10 μm)] Chopped strand CSO3JA497 made by ASAHI Fiber Glass, Fiber diameter: 13 μm
(8) carbon fiber [CF (7 μm)] BESFAITO HTA-C6-S made by Toho Rayon, fiber diameter: 7 μm
(9) carbon fiber [CF (18 μm)] KRECA C-103T made by Kureha Chemical Industry, fiber diameter: 18 μm Examples 12–15, Comparative Examples 7, 8

The raw materials shown in Table 3 were supplied to a Brabender type viscosity meter in the blend rates shown in the same table and melt-kneaded. The kneaded mixture was roughly crushed to 3 mm-square chips and they were heat/compression-molded to obtain columnar molded bodies 30 mm diameter and 10 mm long. Pin type specimens 3 mm diameter, 10 mm long were cut out of the columnar molded bodies by cutting. The orientation of the fibrous reinforcing material at the surface and inside of the pins was random (no orientation). The fiber axes were varied among normal, parallel and inclined relative to the sliding surface of the cut out molded bodies, in a mixed state.

Using the pin type specimens obtained, the above-described friction/wear test was conducted under the same conditions to investigate the dynamic friction coefficient immediately after start of the test, dynamic friction coefficient at the end of 20-hour continuous friction test, existence of sliding sound during the test (○: existed, x : not existed), and the surface roughness (Rz) after the end of the test. These results are shown in Table 3.

As will be apparent from the results of Table 3, in Comparative Examples 7, 8, in which the fiber diameter of the fibrous reinforcing material exceeds 10 μm, although the friction coefficient was low immediately after start of the test, as the testing time passed, it damaged the nickel-plated surface of the mating member. Thus the friction coefficient increased sharply, so that at the end of the test, it reached twice the value at the start. In Comparative Example 7, in which glass fiber having a fiber diameter of 13 μm was used, sliding sounds were generated during the test.

In contrast, in Examples 12 to 15 in which the fiber diameter of the fibrous reinforcing material was as small as 10 μm or under, change in the friction coefficient value during the test was small and the surface roughness of the mating member was small and kept smooth. There was no sliding sound.

The resin composition for precision sliding part according to the present invention meets the required precision moldability and dimensional stability and exhibits low friction coefficient and stable sliding properties and good wear resistance.

By adjusting the ratio of tetrafluoroethylene resin to graphite to 1:1 to 1:5, the abovesaid advantages can be expected more reliably.

By using glass fiber or carbon fiber as the fibrous reinforcing agent or adjusting the content of the fibrous reinforcing agent to 3 to 25 volume %, the intended advantages can be expected more reliably.

By forming a carriage of an electronic image scanner or printing head of the resin composition according to the present invention, a carriage is provided which can slide without grease, is less liable to dust adhering to the sliding surface and wear with sliding, and can operate more smoothly with less noise.

Also, it will not damage the mating member, needless to say if it is made of stainless steel or Ni-plated steel and even if it is made of zn-plated steel which is softer.

If the orientation angle of the fiber axis of the fibrous reinforcing material is adjusted, since the fiber ends of the fibrous reinforcing material are exposed at an angle of 30 degrees or under with respect to the sliding surface, the degree of damage inflicted on the mating member by the fiber ends decreases, and also precision molding is possible. Thus, sliding precision parts such as carriages of printers or optical or magneto-optical memory/reading devices satisfy the required precision moldability and also have low friction coefficient and excellent wear resistance.

If the sliding surface is formed by the lubricative resin composition of this invention in which a fibrous reinforcing material having a fiber diameter of 10 μm or lower is blended in a dispersed state, since the fiber ends exposed to the sliding surface are pulverized into very fine particles which would not damage the mating member, the sliding precision part are low in friction coefficient and high in wear resistance, and also satisfy the required precision molding properties.

Also, if a lubricative resin composition whose main component is a modified polyphenylene ether resin or syndiotactic polystyrene resin is employed, or if a lubricative resin composition is used which contains a solid lubricant, a liquid lubricant or a combination thereof, the sliding precision part obtained will be low in friction coefficient and high in wear resistance, and also satisfy the required precision molding properties.

Also, if glass fiber or carbon fiber is employed as the fibrous reinforcing material, the above-described advantages are obtained more reliably.

Also, if the precision sliding part is a carriage of an electronic image scanner, a pickup for a memory device or a printing head, mechanical sounds are low and noise is hardly produced, and malfunction will not occur.

TABLE 1

| | Example | | | | | | | Comparative Ex. | |
|---|---|---|---|---|---|---|---|---|---|
| | 1 | 2 | 3 | 4 | 5 | 6 | 7 | 1 | 2 |
| Composition (vol-%) | | | | | | | | | |
| (1) modified PPE | 65 | 70 | 70 | 70 | 70 | 65 | 70 | 70 | 70 |
| (2) GF1 | 15 | 15 | 15 | — | 15 | 20 | — | 15 | 15 |
| (3) GF2 | — | — | — | 15 | — | — | — | — | — |
| (4) CF | — | — | — | — | — | — | 15 | — | — |
| (5) PTFE | 7 | 7.5 | 5 | 5 | 2 | 5 | 5 | 15 | — |
| (6) GRP | 13 | 7.5 | 10 | 10 | 13 | 10 | 10 | — | 15 |
| Ni plating | | | | | | | | | |
| Friction coefficient | | | | | | | | | |
| at start of test | 0.48 | 0.44 | 0.37 | 0.37 | 0.41 | 0.45 | 0.38 | 0.46 | 0.42 |
| at end of test | 0.51 | 0.47 | 0.44 | 0.41 | 0.49 | 0.49 | 0.42 | 0.66 | 0.48 |
| pin wear length (μm) | 38 | 35 | 9 | 6 | 22 | 11 | 6 | 67 | 88 |
| Zn plating | | | | | | | | | |
| Friction coefficient | | | | | | | | | |
| at start of test | 0.32 | 0.31 | 0.29 | 0.28 | 0.28 | 0.31 | 0.21 | 0.37 | 0.37 |
| at end of test | 0.33 | 0.31 | 0.30 | 0.28 | 0.31 | 0.32 | 0.21 | 0.38 | 0.41 |
| pin wear length (μm) | 12 | 11 | 7 | 4 | 9 | 7 | 6 | 157 | 281 |

TABLE 2

|  | Example | | | | Comparative Example | | | |
|---|---|---|---|---|---|---|---|---|
|  | 8 | 9 | 10 | 11 | 3 | 4 | 5 | 6 |
| Composition | | | | | | | | |
| modified PPE | 55 | 55 | — | — | 55 | 55 | — | — |
| SPS | — | — | 90 | 90 | — | — | 90 | 90 |
| GF | 30 | 30 | — | — | 30 | 30 | — | — |
| PTFE | 5 | 5 | 10 | 10 | 5 | 5 | 10 | 10 |
| GRP | 10 | 10 | — | — | 10 | 10 | — | — |
| Molding condition | | | | | | | | |
| resin temperature (° C.) | 310 | 310 | 290 | 290 | 310 | 310 | 290 | 290 |
| Injection pressure (MPa) | 90 | 90 | 54 | 54 | 90 | 90 | 54 | 54 |
| Mold temperature (° C.) | 100 | 100 | 140 | 140 | 100 | 100 | 140 | 140 |
| Angle of fiber axis to sliding surface (deg) | 0 | 30 | 0 | 30 | 45 | 90 | 45 | 90 |
| Friction coefficient | | | | | | | | |
| at start of test | 0.35 | 0.42 | 0.44 | 0.42 | 0.40 | 0.49 | 0.38 | 0.46 |
| at end of test | 0.36 | 0.41 | 0.40 | 0.43 | 1.12 | 1.16 | 1.08 | 1.04 |
| Sliding sound | ○ | ○ | ○ | ○ | ○ | X | ○ | X |
| Surface roughness of mating member Rz ($\mu$m) | 0.05 | 0.07 | 0.06 | 0.07 | 0.12 | 0.15 | 0.14 | 0.12 |

TABLE 3

|  | Example | | | | Comparative Ex. | |
|---|---|---|---|---|---|---|
|  | 12 | 13 | 14 | 15 | 7 | 8 |
| Composition | | | | | | |
| modified PPE | 55 | 55 | 55 | — | 55 | 55 |
| SPS | — | — | — | 90 | — | — |
| GF (13 $\mu$m) | — | — | — | — | 30 | — |
| GF (6 $\mu$m) | 30 | — | — | — | — | — |
| GF (10 $\mu$m) | — | 30 | — | — | — | — |
| GF (7 $\mu$m) | — | — | 30 | — | — | — |
| GF (18 $\mu$m) | — | — | — | — | — | 30 |
| PTFE | 5 | 5 | 5 | 10 | 5 | 5 |
| GRP | 10 | 10 | 10 | — | 10 | 10 |
| Molding condition | | | | | | |
| resin temperature (° C.) | 310 | 310 | 310 | 290 | 310 | 310 |
| pressure (MPa) | 50 | 50 | 50 | 50 | 50 | 50 |
| Friction coefficient | | | | | | |
| at start of test | 0.37 | 0.38 | 0.33 | 0.38 | 0.45 | 0.37 |
| at end of test | 0.46 | 0.56 | 0.41 | 0.64 | 1.05 | 0.91 |
| Sliding sound | ○ | ○ | ○ | ○ | X | ○ |
| Surface roughness of mating member Ra ($\mu$m) | 0.05 | 0.07 | 0.04 | 0.06 | 0.14 | 0.08 |

What is claimed is:

1. A resin composition for precision sliding parts, said resin composition comprising a modified polyphenylene ether resin as a main component, wherein said modified polyphenylene ether resin is prepared by blending a polystyrene-family resin with a polyphenylene ether resin, a fibrous reinforcing agent selected from the group consisting of glass fiber and carbon fiber, wherein the ratio of said fibrous reinforcing agent is 3 to 22.5 volume %, and a solid lubricant comprising both tetrafluoroethylene resin and graphite in the amount of 2–30 volume %, wherein the ratio of said tetrafluoroethylene resin and said graphite is 1:1 to 1:5.

2. The resin composition as claimed in claim 1 wherein said precision sliding part is a carriage of an electronic image scanner, a pickup for a memory device or a printing head.

3. A resin-made precision sliding part having a sliding surface formed by a lubricative resin composition comprising a modified polyphenylene ether resin or syndiotactic polystyrene resin as a main component and containing a fibrous reinforcing material selected from the group consisting of glass fiber and carbon fiber in a dispersed state, wherein said fibrous reinforcing material has a fiber diameter of 10 $\mu$m or less and is orientated such that the angle of fiber axis is not more than 30 degrees with respect to said sliding surface.

4. The resin-made precision sliding part as claimed in claim 3 wherein said lubricative resin composition contains a solid lubricant, a liquid lubricant or a combination thereof.

5. The resin-made precision sliding part as claimed in claim 3 wherein said precision sliding part is a carriage of an electronic image scanner, a pickup for a memory device or a printing head.

6. The resin composition as claimed in claim 1 wherein the graphite is powdery graphite.

* * * * *